(12) United States Patent
Vandenberg

(10) Patent No.: US 8,382,414 B2
(45) Date of Patent: Feb. 26, 2013

(54) THREADED FASTENER AND RELATED METHOD OF INSTALLATION

(75) Inventor: Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 256 days.

(21) Appl. No.: 12/984,386

(22) Filed: Jan. 4, 2011

(65) Prior Publication Data

US 2011/0170985 A1    Jul. 14, 2011

Related U.S. Application Data

(60) Provisional application No. 61/293,898, filed on Jan. 11, 2010.

(51) Int. Cl.
    *F16B 35/06* (2006.01)
(52) U.S. Cl. .......... 411/402; 411/399; 411/386
(58) Field of Classification Search .......... 411/402, 411/403, 410, 399, 386–387.7
    See application file for complete search history.

(56) References Cited

U.S. PATENT DOCUMENTS

| | | | |
|---|---|---|---|
| 126,366 A | 4/1872 | Wills | |
| 137,414 A | 4/1873 | Burdick | |
| 138,784 A | 5/1873 | Bourn | |
| 411,202 A | 9/1889 | Rose | |
| 2,083,092 A * | 6/1937 | Richer | 411/403 |
| 2,229,565 A * | 1/1941 | Hallowell, Jr. | 411/403 |
| 2,774,969 A | 12/1956 | Samples | |
| 2,994,878 A | 8/1961 | Abrahamsen | |
| 3,010,496 A | 11/1961 | Bruce | |
| 3,012,247 A | 12/1961 | Sillars | |
| 3,147,484 A | 9/1964 | Nelson | |
| 3,316,949 A | 5/1967 | Canfield | |
| 3,360,176 A | 12/1967 | Gehl | |
| 3,942,405 A | 3/1976 | Wagner | |
| 4,018,254 A | 4/1977 | DeCaro | |
| 4,146,071 A | 3/1979 | Mueller et al. | |
| 4,625,597 A | 12/1986 | Cast | |
| 5,019,080 A * | 5/1991 | Hemer | 606/104 |
| 5,083,483 A | 1/1992 | Takagi | |
| 5,322,396 A | 6/1994 | Blacker | |
| 5,337,635 A | 8/1994 | Habermehl | |
| 5,341,706 A | 8/1994 | Takagi | |

(Continued)

FOREIGN PATENT DOCUMENTS

| CA | 1242601 | 10/1988 |
|---|---|---|
| CH | 695482 | 6/2006 |

(Continued)

OTHER PUBLICATIONS

Fiberon DeckPilot Mar. 2009.

(Continued)

*Primary Examiner* — Flemming Saether
(74) *Attorney, Agent, or Firm* — Warner Norcross & Judd LLP

(57) ABSTRACT

A fastener including a head defining a hexalobular drive hole, a shaft, threads and a pointed end. The hexalobular drive hole can include points having an outermost portion, and the head can include an outer surface, where a thickness of about 0.01 inches to about 0.04 inches is defined between the outer surface and each respective point. The outer surface can be cylindrical, and can transition to a tapered portion that is joined with the shaft. The tapered portion can be frustoconical, angled and/or curvilinear. A related method of installation is provided for advancing the fastener into the side of a first board at an angle to fasten the first board to an underlying second board.

17 Claims, 3 Drawing Sheets

U.S. PATENT DOCUMENTS

| | | | |
|---|---|---|---|
| 5,351,586 A | 10/1994 | Habermehl et al. | |
| 5,452,630 A | 9/1995 | Haas et al. | |
| 5,469,767 A | 11/1995 | Habermehl | |
| 5,531,142 A | 7/1996 | Adamo | |
| 5,531,143 A | 7/1996 | Habermehl et al. | |
| 5,568,753 A | 10/1996 | Habermehl et al. | |
| 5,570,618 A | 11/1996 | Habermehl et al. | |
| 5,687,624 A | 11/1997 | Tsuge et al. | |
| D391,135 S | 2/1998 | Habermehl et al. | |
| 5,839,332 A | 11/1998 | Fujiyama et al. | |
| 5,871,486 A | 2/1999 | Huebner et al. | |
| 5,884,541 A | 3/1999 | Habermehl et al. | |
| 5,904,079 A | 5/1999 | Tsuge et al. | |
| 5,918,512 A | 7/1999 | Habermehl et al. | |
| 5,927,163 A | 7/1999 | Habermehl et al. | |
| 5,934,162 A | 8/1999 | Habermehl | |
| 5,988,025 A | 11/1999 | Sasaki et al. | |
| 6,027,004 A | 2/2000 | Ramella et al. | |
| 6,089,132 A | 7/2000 | Habermehl | |
| 6,098,442 A | 8/2000 | Walldorf et al. | |
| 6,109,144 A | 8/2000 | Muro | |
| 6,109,146 A | 8/2000 | Muro | |
| 6,244,140 B1 | 6/2001 | Habermehl | |
| 6,334,748 B1 * | 1/2002 | Gudjonsson | 411/399 |
| 6,394,712 B1 | 5/2002 | Weinstein et al. | |
| 6,419,489 B1 * | 7/2002 | Jorneus et al. | 433/141 |
| 6,425,306 B1 | 7/2002 | Habermehl | |
| 6,439,085 B1 | 8/2002 | Habermehl | |
| 6,453,780 B2 | 9/2002 | Habermehl | |
| 6,481,937 B1 | 11/2002 | Sommerfeld et al. | |
| 6,592,015 B1 | 7/2003 | Gostylla et al. | |
| 6,601,480 B1 | 8/2003 | Habermehl | |
| 6,632,057 B1 * | 10/2003 | Fauchet | 411/403 |
| 6,769,332 B2 | 8/2004 | Muro | |
| 6,843,402 B2 | 1/2005 | Sims et al. | |
| 6,915,724 B2 | 7/2005 | Kigel et al. | |
| 6,941,847 B2 | 9/2005 | Habermehl et al. | |
| 7,044,460 B2 | 5/2006 | Bolton | |
| 7,165,481 B2 | 1/2007 | Kikuchi | |
| 7,231,854 B2 | 6/2007 | Kikuchi | |
| 7,344,057 B2 | 3/2008 | Dion et al. | |
| 7,424,840 B1 | 9/2008 | Huang | |
| 7,454,996 B2 | 11/2008 | Hsu | |
| 7,487,699 B2 | 2/2009 | Xu | |
| 7,866,236 B2 | 1/2011 | Hsu | |
| 7,950,312 B2 | 5/2011 | Matthiesen et al. | |
| 7,992,469 B2 | 8/2011 | Chang et al. | |
| 8,123,524 B2 * | 2/2012 | Anitua Aldecoa | 433/173 |
| 8,162,196 B2 | 4/2012 | Gasser et al. | |
| 2004/0175674 A1 * | 9/2004 | Hurson | 433/173 |
| 2005/0278934 A1 | 12/2005 | Orchard | |
| 2008/0264218 A1 | 10/2008 | Wang et al. | |
| 2008/0276761 A1 | 11/2008 | Hale et al. | |
| 2008/0296341 A1 | 12/2008 | Francescon | |
| 2009/0314143 A1 | 12/2009 | Chen | |
| 2010/0083610 A1 | 4/2010 | King | |
| 2011/0232430 A1 | 9/2011 | Hale | |
| 2012/0000327 A1 | 1/2012 | Park | |
| 2012/0048909 A1 | 3/2012 | Gensmann et al. | |
| 2012/0073410 A1 | 3/2012 | Hoffman et al. | |

FOREIGN PATENT DOCUMENTS

| | | |
|---|---|---|
| DE | 4228727 | 3/1994 |
| DE | 4331689 | 3/1994 |
| EP | 1595627 | 11/2005 |
| EP | 1920890 | 5/2008 |
| EP | 1932623 | 6/2008 |
| EP | 1938928 | 7/2008 |
| EP | 2258518 | 12/2010 |
| EP | 2397706 | 12/2011 |
| EP | 2076362 | 3/2012 |
| GB | 191001226 | 12/1910 |
| GB | 167620 | 8/1921 |
| GB | 1009630 | 11/1965 |
| GB | 2127927 | 4/1984 |
| JP | 7217625 | 8/1995 |
| JP | 10329049 | 12/1998 |
| JP | 2000257616 | 9/2000 |
| JP | 2004308732 | 11/2004 |
| WO | 2007091487 | 8/2007 |

OTHER PUBLICATIONS

Fiberon DeckPilot Dec. 2009.
Kreg Jig downloaded from http://kregtool.com/products/pht/product.php?PRODUCT_ID=109.
Kreg Jig Jr. downloaded from http://kregtool.com/products/pht/product.php?PRODUCT_ID=32.
Kreg Micro Pocket Drill Guide downloaded from http://kregtool.com/products/pht/product.php?PRODUCT_ID=113.
Bostitch MIIIFN—Hardwood Flooring Cleat Nailer downloaded from http://www.bostitch.com/default.asp?CATEGORY=FLOORING+NAILERS&TYPE=PRO. . . .

* cited by examiner

THREADED FASTENER AND RELATED METHOD OF INSTALLATION

BACKGROUND OF THE INVENTION

The present invention relates to a fastener, and more particularly to a screw including a screw head and a related method of installation.

There are a variety of commercially available fasteners that are designed to fasten a work piece, such as a wooden board or a composite element, to a substrate, such as a subfloor, joist or other underlying support structure. In many cases, these fasteners are in the form of threaded screws including: a large, bugle-shaped head to which an installation drive attaches (for example, a Phillips or star drive screw head); a shaft that projects from the head; threads on the shaft, and a sharpened point, which centers the screw on a location, and initially pierces the board so that the screw can advance into it. These types of screws are typically drilled downward, in an orthogonal manner, into the top of a board to fasten the board to an underlying support, such as a joist. Most of the holding power of such screws come from the bugle-shaped head engaging the board.

Recently, there have been developments in construction techniques and fastener technology that attach boards to a subfloor or underlying joist with screws, but that attempt to conceal the heads of those screws. This is achieved by advancing the screws at an angle through the sides of the boards, rather than the exposed upper surface or tops of the boards, and subsequently into an underlying support structure. When boards are placed side-by-side one another, these "side angled screws" are relatively unnoticeable by an observer looking straight down at the boards. Of course, at an angled view of the board, where portions of the sides of the boards may be visible, the screw heads may be somewhat visible, but usually not overly conspicuous.

In many applications, where the aforementioned screws are drilled through the sides of the boards, they are drilled at an angle relative to the top and bottom surfaces of the boards. Accordingly, much of the holding force of the screw is applied via the shaft or body of the screw, rather than via the head of the screw, as with conventional bugle-head deck screws.

The heads of such side angled screws include a drive feature in which a tool head of a rotary tool can be inserted to rotate the screw and advance it into the board. A common type of drive feature on conventional deck screws is a six-pointed, star-shaped patterned hole. Screws including these types of drive features are usually referred to as star drive head screws. One particular type of star drive is sold under the "TORX" trade name.

Star drive screws, and in particular, TORX head screws, come in a variety of sizes. TORX head sizes are described using the capital letter "T" followed by a number. Smaller numbers correspond to smaller dimensions of the respective screw head features. Common size TORX drives for bugle-type deck screw heads include T-15 and T-25. In contrast to bugle-type deck screws, the conventional side angled screws mentioned above are much smaller in size. For example, conventional side angled screw TORX drives are size T-10. A T-10 drive measures, point-to-point, only 0.107 inches, and only has a maximum torque range of 3.7 Nm to 4.5 Nm.

Because the screw heads of side angled screws are outfitted with such a relatively small T-10 screw drive, only a relatively low amount of torque can be applied to the screws before the TORX screw drive feature is prone to stripping. This can be particularly problematic where the boards or joists into which the side angled screws are drilled are particularly dense, either from being cold or being constructed from a wood or composite that is dense. It also can be problematic where a user improperly sets their installation tool to a high torque, and ends up stripping out the head. It can further pose issues where the screws are constructed from inferior metals or by using manufacturing techniques that lack quality control.

Accordingly, there remains room for improvement to the drive features of side angled deck screws, other features of those screws and related methods of installation.

SUMMARY OF THE INVENTION

A self-threading fastener in the form of a screw including a head is provided. This fastener can be in the form of a screw that can be easily and consistently used in screwing operations where the fastener penetrates a surface of a work piece, such as a board or other building material, and optionally fastens the work piece or material to another work piece, article or underlying support structure.

In one embodiment, the fastener can be a screw, for example, a side angled screw, including a head attached to a body. The head can include a six pointed star drive feature, also referred to as a hexalobular internal drive feature, into which a corresponding drive tool can be inserted and used to drive the screw. One type of suitable star drive feature is a TORX drive, which drive comes in a variety of sizes that are designated by a "T" and a number. The star drive used herein is of a particular size, and specifically, a T-15 size.

In another embodiment, the body of the screw to which the head is attached includes a shaft, threads, and a sharpened point. The sharpened point can be in the form of a conical end portion.

In still another embodiment, the conical end portion can define a v-shape flute to improve the initial advancement of the screw into the work piece, and to initially remove material from the work piece adjacent the sharp point, thereby allowing the sharp point to quickly advance into the work piece.

In yet another embodiment, the head of the screw can be generally cylindrical in shape and can include a uniform diameter along an upper portion, and can taper to a frusto-conical portion in a lower portion. The lower portion further can transition to the shaft of the screw, which may include threads a pre-selected distance from the lower portion of the head.

The screw described herein provides a simple and efficient structure that is easily drilled into a work piece at an angle to hold the work piece in a position relative to an underlying support structure. With the drive feature, the screw can be advanced and rotated under significant torque without the drive feature being stripped or significantly damaged by an associated drive tool. This can prevent unwanted screw failure and other issues associated with continuing to advance or removing a stripped out screw.

These and other objects, advantages, and features of the invention will be more fully understood and appreciated by reference to the description of the current embodiment and the drawings.

DETAILED DESCRIPTION OF THE CURRENT EMBODIMENT

Figure 1:
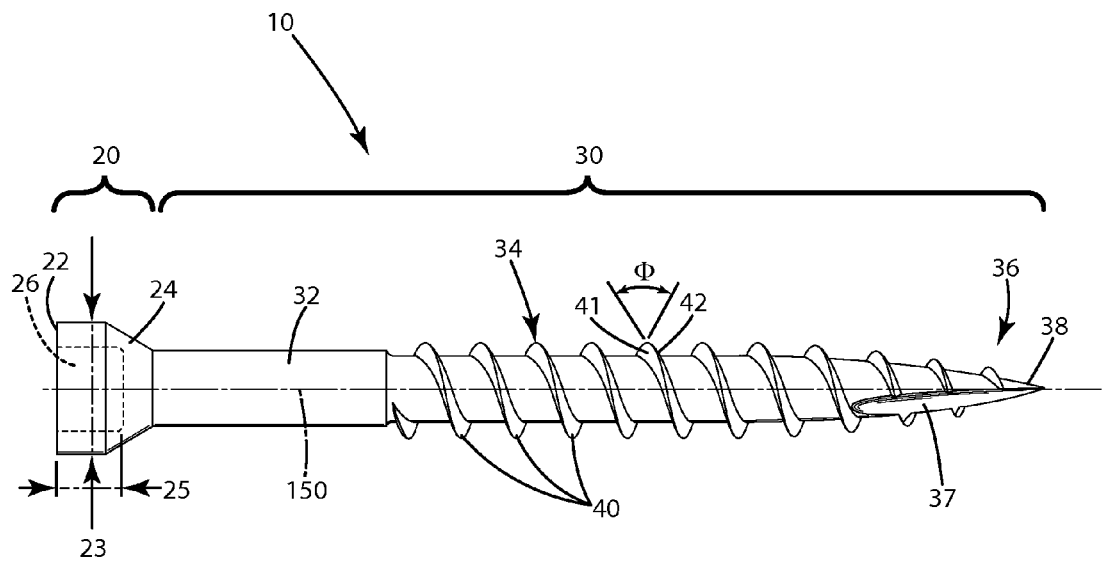
FIG. 1 is a side view of a self-threading screw of the current embodiment.
Figure 2:
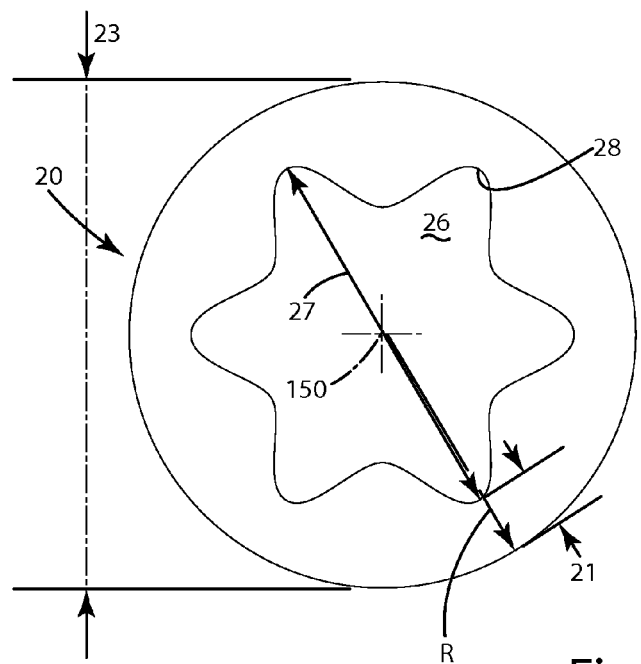
FIG. 2 is a top view of the self-threading screw.
Figure 3:
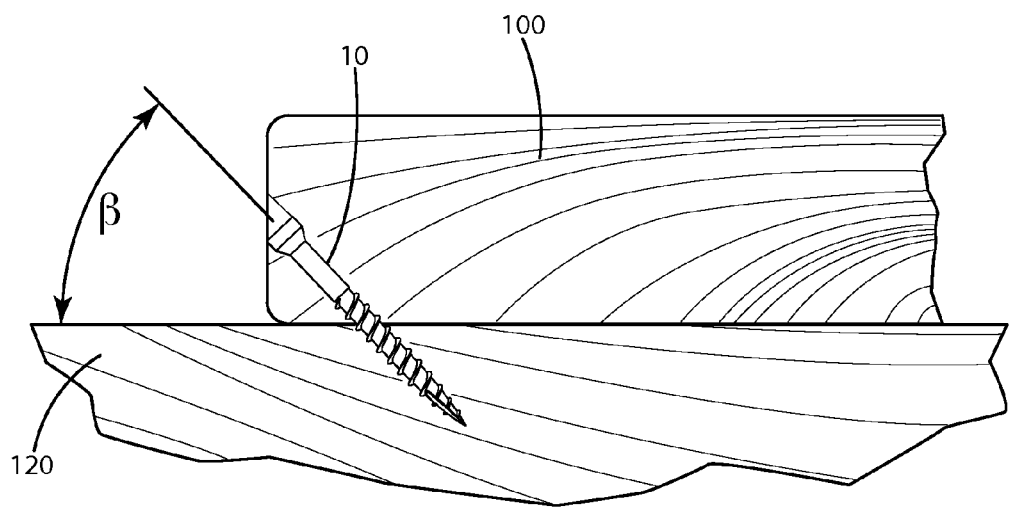
FIG. 3 is a sectional view of the self-threading screw engaged with the side of a board and an underlying structure.

A self-threading screw of the current embodiment is illustrated in FIGS. 1-3 and generally designated 10. The fastener can be in the form of a threaded fastener, and more particularly, a screw 10 including a head 20 and a shaft 30. The head can include an upper portion 22 and a lower portion 24. The upper portion 22 is of a uniform diameter 23 (FIG. 2), which can range from about 0.197 to 0.202 inches in diameter, or can be of other dimensions if desired. The upper portion 22 of the head can include an exterior surface that is substantially cylindrical and of the uniform diameter 23 from the end of the head where the opening to the drive feature is located, to where the upper portion 22 begins to transition to the lower portion 24, where it tapers down to the shaft 30 of the screw 10. Optionally, the lower portion 24 can be in the form of a frustoconical portion.

Figure 4:
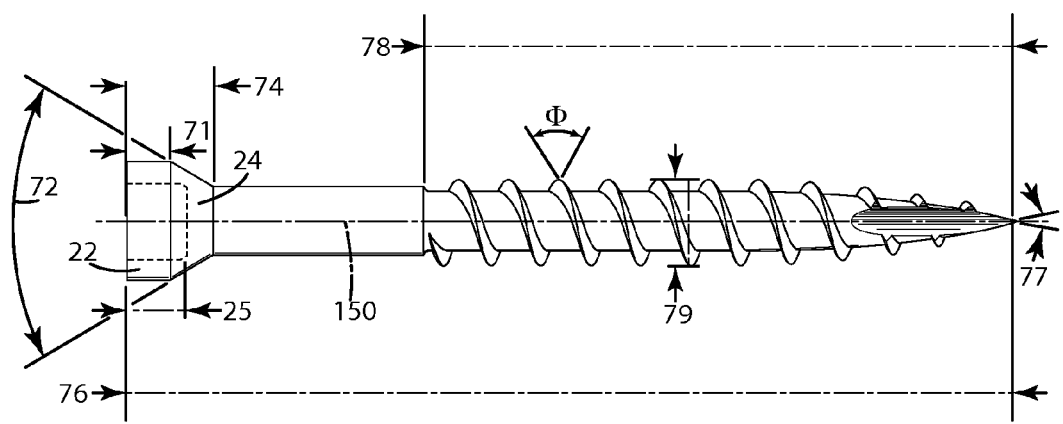
FIG. 4 is another side view of the self-threading screw illustrating some exemplary dimensions and properties.
Figure 5:
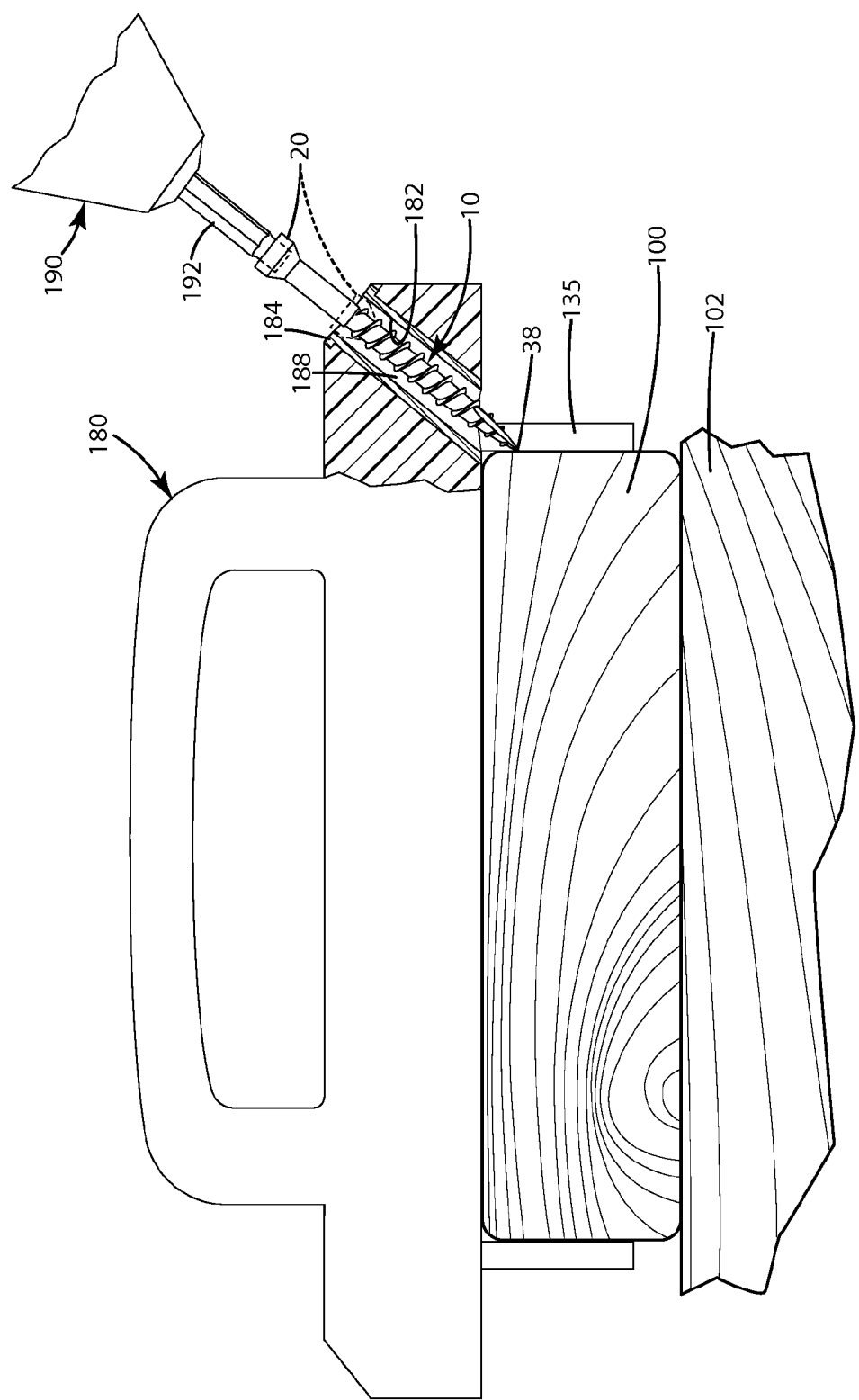
FIG. 5 is a sectional view of the self-threading screw being installed in a board.

As shown in FIG. 4, the upper portion 22 can be of a length dimension 71 that is optionally about 0.01 to about 0.1 inches, further optionally about 0.02 to about 0.08 inches, and even further optionally about 0.06 inches. It has been discovered that this dimension is sufficient to address significant wobble of the screw because the upper portion of the screw engages the inner bore 182 of a bushing 184 of an installation tool 180 as shown in FIG. 5. Accordingly, the screw can be generally advanced in a consistent manner.

The lower portion 24 of the head as mentioned above can be in the form of frustoconical portion. As shown in FIG. 4, the frustoconical angle 72 of the annular exterior surface of the frustoconical portion can optionally be about 45° to about 65°, further optionally about 50° to about 60°, even further optionally about 50°. This particular angle range can enable the head to advance easily into the hole created by the remainder of the body as the screw advances.

The upper portion 22 and lower portion 24 of the head 20 can also collectively define a head dimension 74 as shown in FIG. 4. This head dimension 74 can optionally about 0.01 inches to about 0.25 inches, further optionally about 0.12 inches to about 0.18 inches, and even further optionally about 0.136 inches to about 0.152 inches.

With reference to FIGS. 1 and 2, the upper portion 22 of the head 20 can define a screw drive feature, which as illustrated, is a hole 26 generally in the shape of a six-pointed star. The generic name of this type of drive feature is a star drive, or hexalobular internal driving feature, which is standardized by the International Organization for Standardization as ISO 10644. The type of star drive used herein is a TORX drive, which drive comes in a variety of sizes, generally designated by a "T" and some number. TORX is a trade name of Textron, Inc. of Providence, R.I.

The particular drive and size of the star drive used herein is a T-15 size. The star drive is generally symmetric about the point-to-point dimension 27 shown in FIG. 2. The star drive hole including its six points can include three such point-to-point dimensions, which can all be equal. The dimension 27 from point-to-point of the hole 26 in the screw head is optionally about 0.1 inches to about 0.2 inches and further optionally about 0.128 inches. The points in the star can be of a sharp pointed construction at their outermost portion 28, or can be rounded at their outermost portion 28, as shown in FIG. 2.

The maximum torque range for the head is about 6.4 Nm to about 7.7 Nm, as applied via a corresponding tool or head coupled within the hole 26. The hole 26 is configured to accommodate a T-15 size TORX drive head. This drive head can be connected to a rotary operated tool, such as a drill, that turns the head, and thus the screw 10 to advance the screw into a work piece, as shown in FIG. 5 and explained below.

The hole 26 can be of a depth 25 suitable for the desired application. As shown, the hole depth 25 can be optionally from about 0.060 inches to about 0.085 inches, further optionally about 0.070 inches to about 0.080 inches, and yet further optionally about 0.074 inches to about 0.079 inches.

The illustrated T-15 hole is quite large as compared to the relatively small diameter of the head 20. Thus the material between the points of the hole and the outer diameter 23 of the head around the hole are of a relatively small dimension or thickness. As an example, the thickness 21 of the material measured between the outer diameter 23, and specifically the exterior surface of the upper portion 22, and the outermost portion of the respective points on the star drive hole along a radius R (FIG. 2), can range optionally from about 0.01 inches to about 0.04 inches, further optionally from about 0.02 to about 0.035 inches, and further optionally from about 0.0325 inches to about 0.035 inches. If desired, the thickness 21 can vary slightly from the outermost portion of the hole, that is, from the part of the hole on the very exterior of the head, to the interior-most part of the hole. In such a case, the sidewalls of the hole may slightly taper toward the longitudinal axis as it extends toward the conical end or the shaft of the screw.

The hole 26 can be of a depth equal to, less than or greater than the depth 71 of the upper portion 22 of the head. Generally, the depth 71 of the upper portion can range optionally from about 0.055 to 0.065 inches. The upper portion 22 dimension 71 can be less than the depth 25 of the hole 26. In such a case, the hole 26 is defined by both the upper portion 22 and the lower portion 24 which can be in the form of a frustoconical element or a curved or angled element that tapes to the shaft. As an example, the hole depth 25 can be about 0.074 to about 0.079, and the upper portion 22 dimension 71 can be about 0.06. As another example, the hole is at least about 0.07 inches in depth and the upper portion is less than 0.07 inches in length. Other dimensions can be selected depending on the desired depth of the drive and performance of the drive.

Referring to FIG. 1, the body 30 of the screw can include a shaft 32 that is relatively cylindrical and which extends along an axis 150. Optionally, the shaft can have different diameters along its length, and can transition to the threaded portion 34. The threaded portion 34 can include threads 40 which protrude from it and wrap or coil around it. The threads can continue and extend toward the conical end portion 36. The shaft 32 in the area of the threads can be of a diameter less than that of the shaft near the head 20 if desired. The threads 40 can be of a thread design having a "V" profile or a buttress profile depending on the application. Further, as shown in FIG. 1, the threads can each include a thread angle Ø, which is generally the included angle formed between the upper and lower thread surfaces 41 and 42. This angle can be optionally between 10° and 90°, further optionally between 30° and 70°, and still further optionally between 55° and 60°, and even further optionally about 60°.

The conical end portion 36 can terminate at a sharpened point 38. Of course, other tips and points can be substituted for the sharpened point. If desired, the conical end portion 36 can include some sort of self-tapping feature. For example, as shown, it can include a v-shaped flute 37 which extends from adjacent or at the sharp point 38 upwards toward the head 20 of the screw 10 a predetermined distance. the flute can intersect one, optionally two, and further optionally three or more threads. If desired, the flute can be defined in at least a portion of the cylindrical shaft 32 as well as the threads.

Optionally, the hole, head and conical portion can generally be centered on this axis 150. Further, this axis can correspond to an axis of rotation of the screw, with the components of the screw generally being balanced about the axis 150 to minimize unwanted wobble of the screw 10 as it is rotated.

The sharpened point 38 can include an exterior surface in the form of a cone, where the point includes an angle 77. This angle 77 can optionally be about 15° to about 35°, further optionally about 20° to about 30°, even further optionally about 25°. This particular angle range can enable the tip to center and quickly penetrate a work surface and rapidly draw the screw into the surface.

The screw 10 can be of a length 76. This length can optionally be about 1 inch to about 4 inches, further optionally about 2 inches to about 3 inches, and further optionally about 2¼ inches to about 2½ inches. Other lengths can be selected based on the application. Further, the distance 78 the threads 78 extend up the shaft 32 can be a portion of the length 76. For example, in side angle screw applications, it has been discovered that the distance 78 can be optionally about ¼ to ¾ length 76 and further optionally about ⅓ to ⅔ length 76, to provide sufficient holding force of a board through which the screw 10 is driven at an angle as shown in FIGS. 3-5.

FIG. 3 illustrates an example of a screw 10 of the current embodiment being installed in a first work piece 100 and a second work piece 102 to join those work pieces. Generally, the screw 10 joins the first work piece 102, which can, for example, be a board, to a second work piece 102, which can be a subfloor, joist or some other support structure.

As shown in FIG. 3, the screw 10 can be advanced into the board 102 a desired distance so that the head is not too conspicuous when viewed from above. The screw 10 can be screwed into the side surface of the board at an angle β which optionally can be about 15° to about 65°; further optionally about 45° or any other desired angle other than 90°.

The screws herein can be used to join a variety of work pieces, such as boards, which as used herein, can include deck boards, porch boards or other boards constructed from wood, particle board, composites, polymers, plastics, metal, combinations of the foregoing, or other materials as desired. Further, although shown as attaching a board to a substrate, the screw herein can be used to join corners of boards, used in cabinetry or trim work.

With reference to FIG. 5, the screw 10 can be installed using an installation tool 180 and a driving tool 190. The installation tool can include a bushing 184 that defines an internal bore 188, generally in the shape of a cylinder. The bore can be oriented relative to the installation tool 180 so that the screw 10 will enter the side surface of the board 100 at the desired angle mentioned above. The screw 10 is placed in the bushing 184, and in particular, in the bore 188, so that it its head 20 projects above the bushing when the screw tip 38 is engaged against the side surface of the board.

A drive tool 190, including for example a hexalobular drive portion 192 that corresponds to the hexalobular drive hole 26 of the screw 10, is placed adjacent the screw so the portion 192 registers snugly in the hole 26. The screw 10 is rotated by the drive tool. The drive tool exerts a rotational torque on the screw to rotate it. The drive tool can exert a torque of up to about 6.4 Nm to about 7.7 Nm, or more or less, depending on the application. The screw tip 38 quickly penetrates the side surface of the board 100, and the threads begin to draw the screw into the board 100.

Rotation of the screw continues at a generally constant rate, until the screw further enters the underlying board 102. In general, the screw advances through the board at the theoretical feed rate of the threads of the screw. The screw 10 then advances into the underlying board a sufficient distance, usually ½ to 1½ inches. The head 20 of the screw is pulled into the side surface of the board 100, until it is at least partially hidden from view. Optionally, the threads engage both the board 102 and the board 100 after the screw is fully installed. Thereafter, the drive tool portion 192 is removed from the drive hole 26. The installation tool 180 is also removed from the board 100, and the above process is repeated at another location along the board.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A fastener comprising:
   a head including an upper portion and a lower portion, the upper portion including a cylindrical outer surface and transitioning to the lower portion, the lower portion being of a frustoconical configuration;
   a shaft joined with the lower portion and extending away from the head, the shaft extending along an axis away from the head, the shaft terminating at a conical end; and
   a thread coiling around the shaft toward and terminating proximal the conical end,
   wherein the head defines a hole in the form of a star including six points,
   wherein the hole defined by the head includes three equal point-to-point dimensions, each of the dimensions being about 0.128 inches,
   wherein the head defines a thickness between the outermost portion of each of the six points and the respective cylindrical outer surface of the upper portion of the head, the thickness being about 0.0325 inches to about 0.035 inches,
   wherein the bore is defined in both the upper portion and the lower portion of the frustoconical configuration.

2. The fastener of claim 1 comprising a v-shaped flute defined by the shaft and at least a portion of the thread proximal the conical end.

3. The fastener of claim 2 wherein the screw defines a length between the upper portion and the conical end, wherein the thread extends from the conical end at least b of the length.

4. The fastener of claim 3 wherein the thread includes upper and lower thread surfaces which are oriented at a thread angle relative to one another, the thread angle being between about 55° and about 60°.

5. The fastener of claim 4 wherein the conical end is sharpened to include an exterior surface in the form of a cone having a point angle that is between about 20° and about 30°.

6. The fastener of claim 1 wherein the lower portion in the form of a frustoconical configuration includes an outer annular surface, the outer annular surface including a frustoconical angle between about 50° and about 60°.

7. A fastener comprising:
a head defining a hexalobular drive hole including six points, each point having an outermost portion, the head including a cylindrical outer surface, the head defining a thickness of about 0.0325 inches to about 0.035 inches between the cylindrical outer surface and the outermost portion of each respective point, the cylindrical outer surface extending parallel to a longitudinal axis at least about 0.01 to about 0.1 inches, the distance from the outermost portion of a first point to the outermost portion of a second point of the hole being about 0.128 inches; and
a threaded shaft joined with the head and centered on the longitudinal axis, the threaded shaft terminating at a pointed conical end.

8. The fastener of claim 7 comprising a flute defined by at least one of the threaded shaft and the pointed conical end.

9. The fastener of claim 8 wherein the flute is v-shaped and extends parallel to the longitudinal axis.

10. The fastener of claim 9 wherein the cylindrical surface is included in an upper portion of the head, wherein the upper surface is joined with a lower portion including a frustoconical element that transitions to the threaded shaft, wherein the hole is defined both within the upper portion of the head and within the frustoconical element.

11. The fastener of claim 10 wherein the hole is at least about 0.07 inches in depth and the upper portion is less than 0.07 inches in length.

12. The fastener of claim 7 wherein the cylindrical outer surface of the head tapers to the threaded shaft.

13. The fastener of claim 12 wherein pointed conical end defines an angle between about 20° and about 30°.

14. The fastener of claim 13 wherein the pointed conical end extends to and end of the head a length, wherein the threaded shaft includes a thread that extends about ⅔ the length.

15. The fastener of claim 14 wherein the thread includes upper and lower thread surfaces defining a thread angle therebetween, the thread angle being between 55° and 60°.

16. The fastener of claim 15 comprising a v-shaped flute defined by at least one of the threaded shaft and the pointed conical end, the v-shaped flute extending along the longitudinal axis.

17. The fastener of claim 16 wherein the cylindrical outer surface tapers to a frustoconical surface.

* * * * *